May 17, 1966     A. E. BRYMER, JR     3,251,673
APPARATUS FOR FORMING GLASS ARTICLES
Original Filed Sept. 8, 1960     7 Sheets-Sheet 1

INVENTOR.
ANDREW E. BRYMER Jr.
BY
ATTORNEYS

May 17, 1966 A. E. BRYMER, JR 3,251,673
APPARATUS FOR FORMING GLASS ARTICLES
Original Filed Sept. 8, 1960 7 Sheets-Sheet 2

INVENTOR.
ANDREW E. BRYMER, JR.
BY
ATTORNEYS

May 17, 1966  A. E. BRYMER, JR  3,251,673
APPARATUS FOR FORMING GLASS ARTICLES
Original Filed Sept. 8, 1960  7 Sheets-Sheet 3

INVENTOR.
ANDREW E. BRYMER, JR.
BY
ATTORNEYS

INVENTOR.
ANDREW E. BRYMER, JR.
BY
ATTORNEYS

May 17, 1966   A. E. BRYMER, JR   3,251,673
APPARATUS FOR FORMING GLASS ARTICLES
Original Filed Sept. 8, 1960   7 Sheets-Sheet 7

FIG. 7A

INVENTOR.
ANDREW E BRYMER. JR
BY
ATTORNEYS

United States Patent Office 3,251,673
Patented May 17, 1966

3,251,673
APPARATUS FOR FORMING GLASS ARTICLES
Andrew E. Brymer, Jr., Toledo, Ohio, assignor to Owens-Illinois Glass Company, a corporation of Ohio
Original application Sept. 8, 1960, Ser. No. 54,628, now Patent No. 3,149,950, dated Sept. 22, 1964. Divided and this application Oct. 7, 1963, Ser. No. 314,213
5 Claims. (Cl. 65—359)

This application is a division of application Serial No. 54,628, filed September 8, 1960, now Patent No. 3,149,-950.

This invention relates to glass forming and shaping mechanism, and in particular, to a parison or a blank forming mechanism for shaping parisons of the narrow-neck type. Such shaping may be either for forming parisons which are ultimately blown to final form or the forming of finally shaped narrow glass articles.

In present day machines of the gob fed type, it is the usual procedure to charge the mold by delivering the gob to the mold at a station preceding the pressing thereof or by charging the mold at the pressing station. It has been the practice in the forming of narrow-neck ware to charge the mold while in inverted position through the bottom opening of the mold disposed uppermost at the time of loading. The narrow neck of the article will be formed at the lowermost portion of the inverted mold in partible neck rings or a neck mold registered adjacent the blank mold. After a baffle plate closes the mentioned uppermost opening of the mold, the plunger is moved vertically from below into the neck mold and the blank mold cavity. After the parison has been pressed, it has been necessary to invert the parison before completing the shaping of the article, which shaping is usually done by enclosing the parison in a blow mold and introducing air under pressure to the interior of the parison, through the opening in the formed neck finish of the article. Because of the fact that it is necessary to close the bottom of the parison mold with a baffle plate before pressing the parison, the final article will have what are termed "baffle marks" when in completed form.

In the present invention, the charge of molten glass is delivered to the parison mold through the neck mold, with the parison mold in a lower adjacent upright position. The parison mold is formed of two pieces so that the two halves may be opened and closed. When forming narrow-neck parisons in an upright position, a relatively large body of molten glass must be contained in the bottom portion of the parison mold and the mold cavity is comprised usually of a number of varying diameters, at least one of which is of greater diameter than the neck mold cavity. This relationship of mold diameters correlated to the ware formed from each mold will define the type of ware herein referred to as "narrow neck" ware. Consequently, it is necessary to use a split parison mold in order to separate the parison from the blank mold after the pressing of the parison has been completed. Furthermore, by providing a two-piece parison mold, this type of split parison mold does not require the use of a baffle. Hence, there is no possibility of having baffle marks on the finished ware.

In the present invention the split blank mold is mounted for vertical movement into engagement with the neck ring parts carried by a horizontally rotated turret. The gob or mold charge is delivered to the closed parison mold when the mold is raised into underlying contact with the neck ring. The plunger mechanism, when actuated, moves the plunger from overhead into vertical alignment with the neck ring and then downwardly into the parison mold cavity. After the pressing is completed, the plunger is retracted, the parison mold opened, and the mold retracted. When there is sufficient clearance between the ends of the plunger and the neck rings and the open blank molds have been lowered below the end of the formed parison, the turret is ready to index to carry the parisons to the next station, namely, the blowing station. After the parison has been blown to final form, the turret is again indexed to carry the completed ware to the takeout station. By providing three sets of neck rings spaced 120° apart, it is possible to have full overlap of operation, that is, while the parison is being pressed a previously pressed parison is being blown to final form and a previously blown article is being discharged at the takeout station.

It is an object of this invention, therefore, to provide a novel glass forming machine for making narrow-neck glass articles.

It is an additional object of this invention to provide two-piece molding apparatus having positive linear motion in opening and closing.

It is a further object of this invention to provide a novel glass forming machine for forming narrow-neck parisons in an upright position.

It is still a further object of this invention to provide a partible mold unit having linear opening and closing motion.

Other and further objects will be apparent from the following descriptive material taken in conjunction with the attached drawings, wherein:

FIG. 1 is a schematic plan view of the parison forming unit of the invention;

FIG. 3 is a side elevational view, partly in section, of the parison forming unit looking in the direction of arrow "3" on FIG. 1;

The accompanying drawings illustrate the present invention as a mechanism for use in a plural mold, double gob, operation in the pressing of glass articles, or parisons for blown containers. However, this invention is not to be limited to use in double gob operation as its principal features may also be applied to single mold and single gob operation. In addition, this invention is also applicable to the pressing of finished glass articles in either a single or double cavity pressing operation.

Referring to the drawings, a parison mold holder 24, also referred to in the trade as a mold cage, is located at the forming station and is arranged for vertical reciprocation into and out of contact with neck molds. The parison mold cage 24 is split and each half carries a pair of parison mold halves. The parison mold cage is carried by a crosshead 25 which in turn is attached to the upper end of a vertically disposed piston rod (not shown).

In order to provide efficient charging of the blank molds, fixed gob guiding means 30 and 31 extend vertically through the upper machine member 19.

As stated before, after the pressing has been completed, a pair of plungers are retracted upwardly until their lower ends clear the neck rings, and simultaneously the parison mold cage 24 is opened and lowered until the formed parisons, which depend from the neck rings, will have sufficient indexing clearance to pass over the surface of the parison mold cage 24. The parisons will be moved to the next station where a blow mold (not shown) is closed about the parisons and the parisons are blown to final form.

Referring now to FIGS. 1 to 7A, a detailed description of the split mold cage and mounting arrangement is presented. As best shown in FIGS. 1 to 5, the mold cage assembly 24 is clamped to the moveable crosshead 25 by means of a yoke-shaped clamp 50 (FIGS. 4 and 5) having clamping faces 51 at opposite ends thereof. The crosshead 25, to which the mold cage 24 is clamped, is a generally hollow cylindrical member serving as a cooling air passage 52 for bringing cooling air to the mold cage 24. The top of crosshead 25 is closed by a base member 53, for supporting the mold cage assembly 24, and the base member 53 is a generally horizontal member having undercut slots 54 (FIGS. 4 and 5) extending along opposite edges thereof to a point midway of the width thereof.

Figure 4:
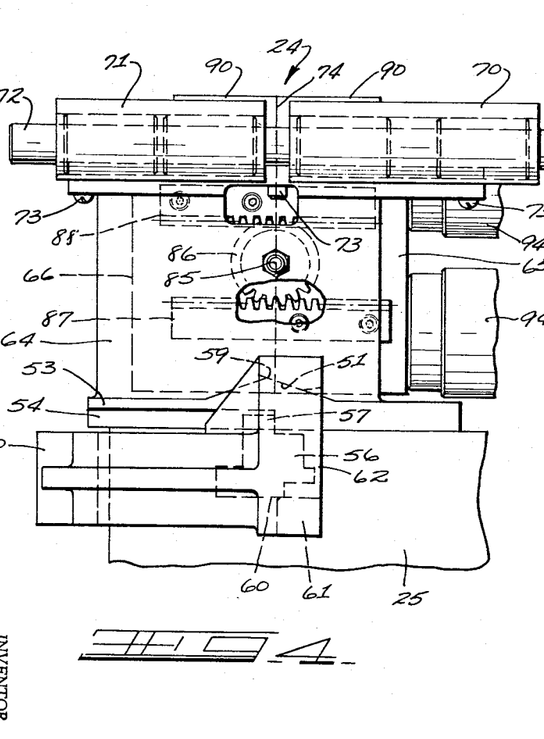
FIG. 4 is a schematic elevational view of the mold unit looking in the direction of arrow "4" on FIG. 1.
Figure 5:
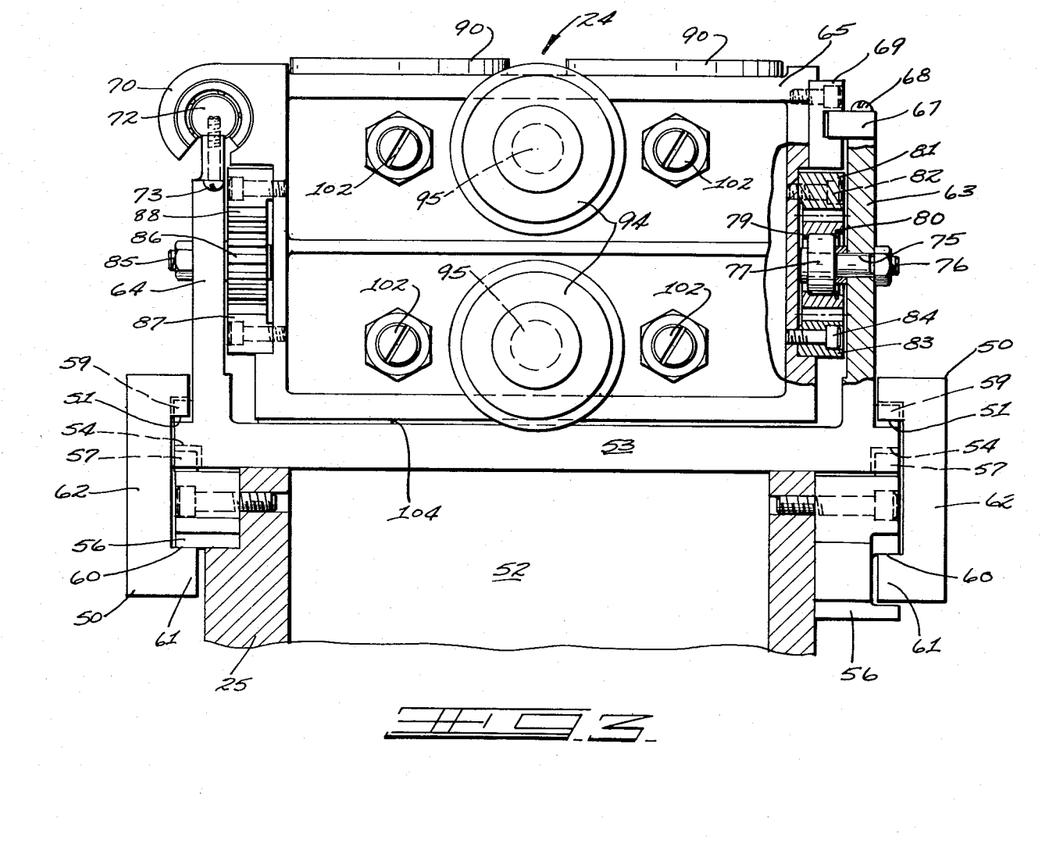
FIG. 5 is a schematic elevational view of the mold unit looking in the direction of arrow "5" on FIG. 1.

These slots 54 provide guiding surfaces when the mold cage and supporting base member are applied to the crosshead 25. A pair of members 56, bolted to opposite sides of the crosshead 25, having portions 57 that extend above the top surface of the crosshead 25 and serve as centering and guiding members in cooperation with the slots 54 in the supporting base 53. The portion 57 of the element 56 limits the positioning of the mold cage supporting base 53 with respect to the crosshead to a fixed horizontal position.

Screw means (not shown) threaded in and extending through the crosshead 25 is adapted to have a head loosely coupled to a bearing plate 58 (FIG. 1) at the central portion of the yoke-shaped clamp 50 and serves to force the clamp in an outward direction thus causing the clamping faces 51 to engage angular clamping surfaces 59 at opposite sides of the mold cage base 53. As can be seen in FIGS. 4 and 5, these clamping surfaces 59 are directly above the portions 57 of the members 56 when the mold support 53 is tightly clamped to the crosshead. The members 56 have additional camming surfaces 60 which overlie beveled corners of inwardly extending portions 61 at the ends 62 of the yoke-shaped clamp 50.

Thus, it can be seen that upon the application of a force to move the yoke clamp 50 in a direction away from the crosshead 25, the clamping faces 51 of the inwardly extending part of the clamp end 62 will abut the surfaces 59 of the base 53 and at the same time the beveled corners of the lower, inwardly extending portions 61 of the clamp ends 62 will underlie the surfaces 60 of the members 56. Thus, by applying force to the plate 58 of the yoke clamp 50, the mold cage base 53 is firmly held against both horizontal and vertical movement relative to the crosshead 25. Removal of the mold cage 24 from the crosshead 25 is accomplished by drawing the yoke in an inward direction to the extent necessary for the inwardly extending portions 61, at the end 62 of the clamp 50, to move out of engagement with the surface 60 on the member 56. This movement allows the ends 62 of the clamp 50 to then be moved vertically a sufficient amount to permit the face 51 to pass over the beveled surface 59 and thus allow the mold cage support 53 to slide across the top of the crosshead 25 and be removed therefrom.

The base member 53 has a pair of parallel vertical upstanding walls 63 and 64 at opposite ends thereof adjacent the clamping surfaces 59. The vertical walls 63 and 64 with the base 53 form a generally U-shaped bracket which serves as the mounting structure for the two blank cage halves 65 and 66. The blank cage halves separate along a vertical plane 74 (see FIGS. 2, 2A, 4 and 5) normal to the walls 63 and 64.

A bearing plate 67 is fastened to the upper edge of the wall 63 by means of suitable fastening elements 68. The bearing plate 67 extends beyond the width of the wall 63 (see FIGS. 2 and 5) and has a portion, throughout its length, which extends beyond the inner surface of the wall 63. The mold cage halves 65 and 66, adjacent the upper edge thereof, carry C-shaped bearing members 69 adapted to embrace the inwardly extending portion of the bearing plate 67, thereby supporting one end of both mold cage halves 65 and 66 for relative movement with respect to the base 53.

Figure 2:
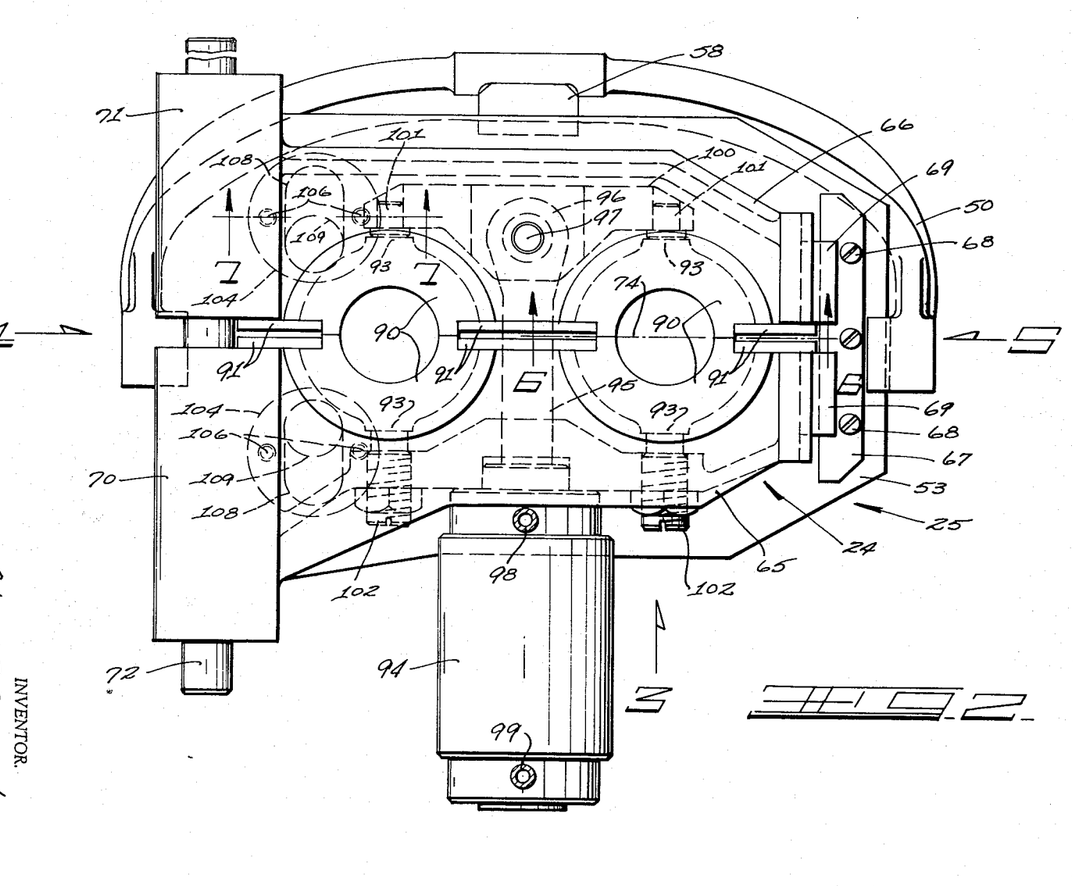
FIG. 2 is a plan view, similar to FIG. 1, showing the parison forming unit in open position.

The opposite end of the mold cage halves 65 and 66 are provided with "ball bushings" 70 and 71 (see FIGS. 1, 2 and 4). These "ball bushings" are available as a standard item manufactured by Thomson Industries, Inc., Manhasset, New York. The "ball bushings" are fastened to the respective mold halves 65 and 66. These "ball bushings" are of a type that allow substantially frictionless axial movement thereof with respect to a fixed shaft 72 forming the inner race for the bearings.

The horizontal shaft 72 is fixed to the vertical wall 64 (see FIGS. 3 and 4) by means of suitable fastening means 73. As shown in FIG. 3, the ball bushings 70 and 71 are open along their length at the bottom thereof to accommodate the fastening means 73 and to allow relative movement of the ball bushings with respect to the shaft 72. Thus, it can be seen that the mold cage halves 65 and 66 are mounted for movement relative to the walls 63 and 64 and the base 53 by means of the described bearings provided at both ends thereof.

In order to insure that the mold cage halves 65 and 66 will open and close on the same vertical plane, means are provided for insuring linear motion of the mold cage halves 65 and 66 in opposite directions relative to the mold parting plane 74. The means for insuring equal opening and closing motion of both cage halves takes the form of rack and pinion interconnections between the mold cage halves (see FIGS. 2A, 3, 4 and 5).

Wall 63, as best shown in FIG. 3, has an opening 75 therethrough whose axis is coincident with the parting plane and is adapted to receive a stub shaft 76. The inner race of a bearing member 77 is fixed to the shaft 76 and the outer race thereof carries a pinion gear 78 for rotation about the axis of the shaft 76. The pinion 78 has an annular internal shoulder 79 against which the outer race of bearing 77 abuts and a retainer ring 80 holds the bearing in engagement with the shoulder 79. The pinion 78 is in mesh with a rack 81, fixed to mold cage half 66 by means of suitable fastening means 82. A second rack 83 is fixed to the mold cage half 65 by means of suitable fastening means 84 and is in engagement at the under side of the pinion 78.

Figure 2A:
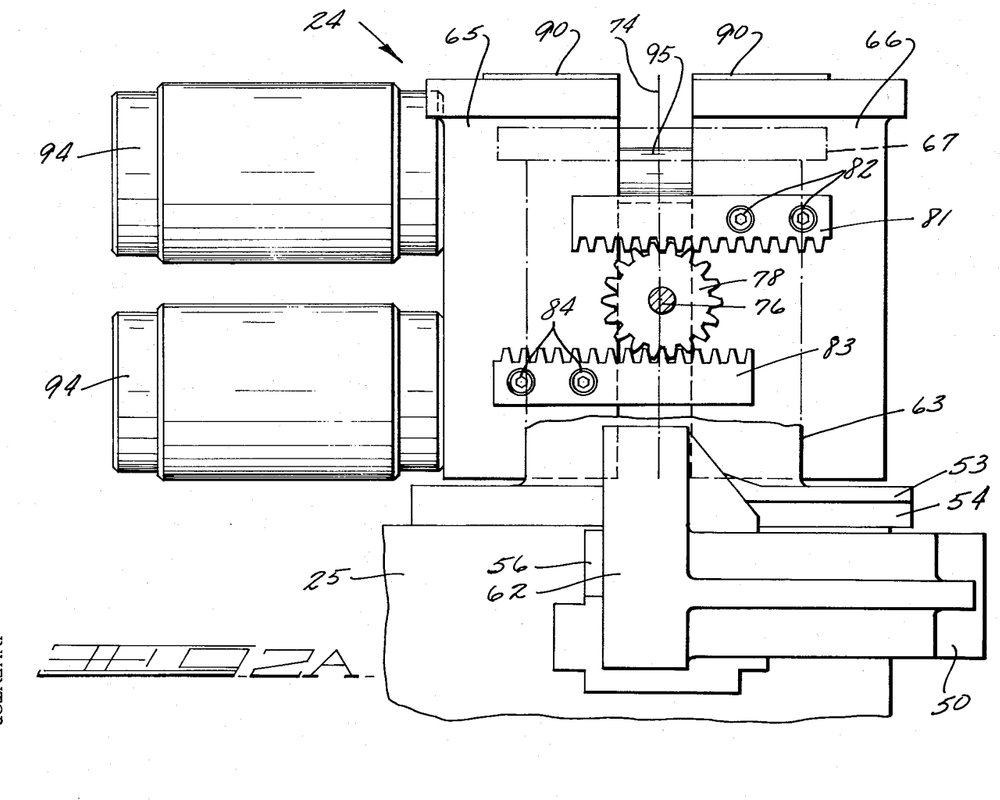
FIG. 2A is a side elevational view, of the unit of FIG. 2, with the vertical wall broken away, and shown in phantom lines.

Thus, it can be seen that upon movement of one mold cage half, such motion will be transmitted by means of its associated rack, to the pinion 78 and in turn to the rack fixed to the other mold half (see FIGS. 2A and 5). This insures equal and opposite motion to the respective mold cage halves.

A substantialy identical rack and pinion arrangement is provided for the opposite end of the mold cage. As can be seen in FIG. 3 and FIG. 4, a stub shaft 85 is fastened to the wall 64 and serves as the supporting member for pinion 86 which is in engagement with a pair of racks 87 and 88 in the same manner as described above with respect to pinion 78 and associated racks 81 and 83. By providing racks and pinions at both ends of the mold cage halves, positive relative linear movement is assured for both mold cage halves 65 and 66. Furthermore, equal opening and closing motions will be assured for each individual mold.

Figure 6:
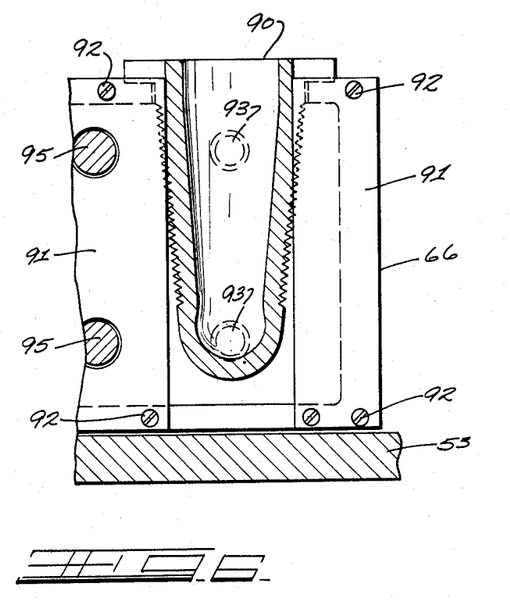
FIG. 6 is a cross-sectional view taken along line 6—6 of FIG. 1.
Figure 7:
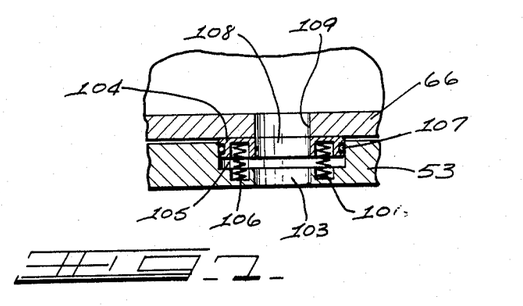
FIG. 7 is a cross-sectional view taken along line 7—7 of FIG. 1.
Figure 7A:
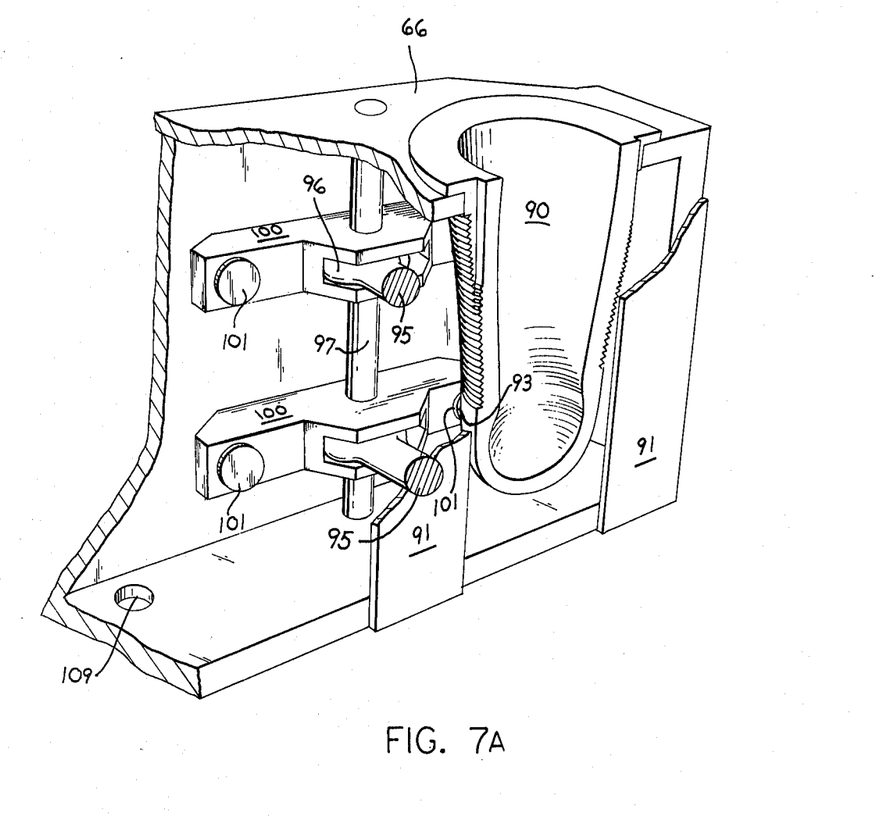
FIG. 7A is a fragmentary perspective view looking in the direction of the equalizer bar mechanism of the apparatus of FIG. 2.

The mold cage halves 65 and 66 are open at the top thereof and provide recesses for supporting parison mold halves 90 in abutting relationship (FIGS. 1, 2 and 7A). The parison mold halves 90 are loosely retained in position within the mold cage halves 65 and 66 by means of mold keepers 91 which are fastened to the mold cage halves 65 and 66 by means of screws 92, as best shown in FIG. 6.

The rear wall of each parison mold half 90 is formed with a pair of abutments 93 (FIGS. 2, 6 and 7A) which serve as surfaces against which mold closing and retaining forces are applied.

The arrangement for opening and closing the parison mold cage halves 65 and 66 along with the parison mold halves 90 takes the form of a pair of hydraulic piston and cylinder motors 94 which are mounted on the mold cage half 65. The hydraulic motors 94 have output shafts whose operating ends 96 embrace a vertical shaft 97 which is fixed within the mold cage half 66 (see FIG. 7A). Operating fluid for the hydraulic cylinder 94 may be introduced through ports 98 and 99, it being understood that the introduction of fluid under pressure through port 99 will cause the mold cage halves to separate and the introduction of fluid under pressure to the port 98 will cause the mold cage halves 65 and 66 to close.

Provision is made for insuring equal closing force application to the parison mold halves 90 retained in mold cage 66 and takes the form of a rocker arm 100 mounted at its center for horizontal oscillation with respect to the shaft 97 (see FIGS. 1, 2 and 7A). The outer ends of the rocker arm 100 carry adjustable bearing pads 101 which are adapted to engage the abutments 93 of the parison mold halves 90 which are retained within the mold cage half 66. The opposite parison mold halves 90, which are retained in the mold cage half 65 are fixed with respect to movement therein by means of adjustable studs 102 which bear on the abutments 93 thereof.

While this description has been limited to the arrangement of a single output shaft 95, single rocker arm 100 and bearing pads 101, it should be pointed out that there are two sets of these element (see FIG. 7A) within the mold cage half 66, one positioned below the other and each aligned with a motor 94.

Referring specifically to FIG. 7, there is shown an arrangement for introducing the cooling air into the interior of the blank mold cage half 66. The cooling air is brought into contact with the under surface of the member 53 through the conveyance of air through the passage 52 in the crosshead 25 (FIG. 3). Communication is provided between the air in contact with the bottom surface of the member 53, and the chamber 103 located within the base member 53.

In order to allow relative movement between the mold cage 66 and base member 53, there necessarily must be some clearance. The details of FIG. 7 show the sealing arrangement for preventing leakage of coolant air out through the clearance between the blank mold cage 66 and the base member 53, prior to entry of the air into the mold cage surrounding the mold halves 90.

An annular disk shaped element 104 fits within a circular recess 105 in the base 53 and is biased in an upward direction by means of springs 106. This annular member 104 is in sealing engagement with the interior walls of the recesses 105. This sealing engagement is assured by the utilization of an O-ring 107 surrounding the periphery of the member 104. The annular member 104 is provided with an elongated opening 108 therethrough and communicates with a circular opening 109 in the bottom of the mold cage 66. As best illustrated in the dotted outline on FIG. 1, the circular opening 109 remains in communication with the elongated opening 108 during opening and closing of the mold cage halves. While FIG. 7 illustrates one of the cooling fluid connecting means, a second substantially identical cooling fluid connecting arrangement is also provided for the introduction of coolant into the mold cage 65. The same reference numerals have been applied to the second cooling arrangement illustrated in FIG. 2, it being understood that the opening 109 will be positioned so as to always be in communication with the opening 108.

Upon the introduction of cooling fluid into the mold cage 65 and 66, the coolant will flow in surrounding relationship with respect to the parison mold halves 90 and be exhausted through the bottom of the mold cage halves along the parting line thereof inasmuch as the mold cage halves 65 and 66 do not actually come into sealing contact with each other when the mold cages are closed. This is true because the parison mold halves 90, when in sealing engagement, extend beyond the plane of the keepers and prevent the mold keepers from coming into contact with each other.

The forces exerted by the hydraulic cylinders 94, when holding the parison mold halves together to form the parison mold cavities, are equalized as between the two cavities by reason of the fact that the arm 100 is mounted for pivotal movement with respect to the pin 97 (see FIG. 7A). Thus, whatever force is applied to maintain one set of molds closed will also necessarily be used to maintain the other set of molds closed.

In summary, it can be seen that the disclosed apparatus will provide a compact arrangement for forming narrow neck containers wherein the mold charges are delivered through the neck rings into the closed two-piece parison mold.

Furthermore, the pressing of the parison is provided by movement of the plungers through the neck rings and upon retraction of the plungers, opening of the parison molds, and their subsequent lowering, the parisons may be transferred laterally to a blow station where they may be blown to final form. The advantage of loading through the neck ring is apparent from the fact that it is possible to use a parison mold formed of only two sections. The advantage of a two section parison mold for narrow neck ware is the elimination of baffle marks which are present when parison molds are loaded in an inverted position and pressed from below.

It is also apparent from the above description that complete overlap of operation in the two forming steps and the discharge step is possible and results in the ability to increase production.

It will, of course, be understood that various details of construction may be modified through a wide range without departing from the principles of this invention, and it is, therefore, not the purpose to limit the patent granted hereon otherwise than necessitated by the scope of the appended claims.

I claim:
1. Apparatus for simultaneously forming a pair of narrow neck parisons in an upright position, comprising a base member, a mold supporting cage formed of two complementary halves partible along a vertical parting plane, two parison mold halves carried by each mold cage half in side-by-side relationship with their axes vertical, said mold cage halves being mounted on said base member for limited straight-line horizontal movement relative to each other and normal to said parting plane, fluid-operated means mounted on one mold cage half and connected to said other mold cage half for effecting relative movement of said two mold cage halves, means interposed between and engageable with said mold cage halves for reciprocating said mold cage halves in equal and opposite directions, and means fulcrumed on the other mold cage half and engaging the two parison mold halves carried by said other mold cage half for applying equal closing forces to both parison molds when said mold cage is closed.

2. Apparatus as defined in claim 1, wherein said means for effecting equal opening and closing of said mold cage halves with respect to said base comprises a pinion mounted on said base for rotation about a horizontal axis coincident with the parting plane of said mold halves and horizontal separate racks mounted on each mold cage half in diametrically opposed engagement with said pinion, whereby movement of one cage half will cause equal and opposite movement of the other cage half.

3. Apparatus as defined in claim 1 wherein there are bearing members mounted on the upper ends of said walls, complementary bearing means carried by said split mold cage in cooperative relationship with respect to said bearing members for supporting said partible mold supporting cage for movement relative to said walls, said bearing members and bearing means serving to confine said partible mold support cage to linear horizontal motion in a direction parallel to said walls.

4. The apparatus as defined in claim 3, wherein the means interconnecting the mold cage halves for effecting equal opening and closing motion of both cage halves comprises a pinion mounted on one vertical wall for rotation about a horizontal axis, a horizontal rack fixed to one mold cage half and engaging the top of said pinion, and a second horizontal rack fixed to the other mold cage half and engaging the bottom of said pinion, whereby movement of either cage half results in equal and opposite movement of said other cage half.

5. The apparatus as defined in claim 3, wherein the means interconnecting the mold supporting cage halves for effecting equal opening and closing motion of both cage halves comprises a pinion mounted on each vertical wall for rotation about a fixed horizontal axis, a first pair of horizontal racks fixed to opposite ends of one mold cage half and engaging the top of said pinions, a second pair of horizontal racks fixed to opposite sides of the other mold cage half and engaging the bottom of said pinions whereby movement of either cage half requires positive, equal and opposite movement of said other cage half.

References Cited by the Examiner
UNITED STATES PATENTS

| 1,729,363 | 9/1929 | Schwenzfeier. | |
| 1,845,654 | 2/1932 | Flexon | 65—360 |
| 1,856,577 | 5/1932 | McLaughlin | 65—360 |
| 2,834,155 | 5/1958 | Allen | 65—360 |
| 3,132,933 | 5/1964 | Powers | 65—357 |

DONALL H. SYLVESTER, *Primary Examiner.*